(12) United States Patent
Takahashi (10) Patent No.: US 6,298,296 B1
(45) Date of Patent: Oct. 2, 2001

(54) CURVE APPROACH CONTROL APPARATUS (75) Inventor: Akira Takahashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/633,119

(22) Filed: Aug. 4, 2000

(30) Foreign Application Priority Data

Aug. 10, 1999 (JP) .................................................. 11-226738

(51) Int. Cl.$^7$ ........................... G08G 1/133; G01C 21/00
(52) U.S. Cl. .............................. 701/70; 701/79; 701/208; 340/995
(58) Field of Search .................................. 701/70, 72, 75, 701/78, 79, 93, 94, 207, 208, 209, 211; 340/988, 990, 995

(56) References Cited

U.S. PATENT DOCUMENTS 5,315,295 * 5/1994 Fujii ...................................... 340/936

FOREIGN PATENT DOCUMENTS

| 4-236699 | 8/1992 | (JP) . |
| 8-2274 | 1/1996 | (JP) . |
| 11-2528 | 1/1999 | (JP) . |
| 11-83501 | 3/1999 | (JP) . |

* cited by examiner

*Primary Examiner*—Tan Nguyen
(74) *Attorney, Agent, or Firm*—Smith, Gambrell & Russell, LLP (57) ABSTRACT

A curve approach control apparatus of the present invention comprises a front road attribute calculation/storage unit 24 judging whether a node represents an exit/entrance road from/to the main road. The control execution decision unit 31 judges whether the node Pt on a curve in front of the vehicle which is subject to the control represents an exit/entrance road. When the node Pt represents the exit/entrance road, the control execution decision unit 31 inhibits the alarm control and the deceleration control for the curve.

20 Claims, 7 Drawing Sheets

| START | NUMBER OF NODES OUTPUT n | CAR POSITION, EAST LONGITUDE | CAR POSITION, NORTH LATITUDE | NODE POSITION FROM CAR (EAST LONGITUDE) | NODE POSITION FROM CAR (NORTH LATITUDE) | INTER-SECTION FLAG | ROAD KIND | ROAD WIDTH | NODE POSITION FROM CAR (EAST LONGITUDE) | NODE POSITION FROM CAR (NORTH LATITUDE) | INTER-SECTION FLAG | ROAD KIND | ROAD WIDTH |

DATA ON NODE IMMEDIATELY BEFORE CAR — DATA ON NODE IMMEDIATELY AFTER CAR — DATA ON NODE TWO NODES IN FRONT OF CAR

| NODE POSITION FROM CAR (EAST LONGITUDE) | NODE POSITION FROM CAR (NORTH LATITUDE) | INTER-SECTION FLAG | ROAD KIND | ROAD WIDTH | ... | NODE POSITION FROM CAR (EAST LONGITUDE) | NODE POSITION FROM CAR (NORTH LATITUDE) | INTER-SECTION FLAG | ROAD KIND | ROAD WIDTH | END |

DATA ON NODE(N-1) NODES IN FRONT OF CAR

CURVE APPROACH CONTROL APPARATUS

BACKGROUND OF THE INVENTION

1. Field of the Invention

The present invention relates to a curve approach control apparatus which controls a vehicle to make it travel a curved road at an appropriate speed.

2. Description of the Related Art

Many curve approach control apparatus have been proposed which use road map data in a navigation device to detect an overspeed state of a vehicle with respect to a curve in front and activate an alarm or deceleration control. For example, Japanese Patent Unexamined Publication No. Hei. 4-236699 (JP-A-4-236699) discloses a technology which determines an appropriate approach speed at which to enter the curve based on a radius of curvature of a curve in an optimum travel path (guided path) set in the navigation device and on detected road surface conditions and, when an actual vehicle(car) speed is higher than the calculated value of the appropriate approach speed, issues a warning to alert the driver to the need for reducing the vehicle speed, or automatically activates a vehicle speed reduction means in combination with the warning.

A method of determining a curve's radius of curvature by using road map data in the navigation device is disclosed, for example, in Japanese Patent Unexamined Publication No. Hei. 11-2528(JP-A-11-2528) filed by the applicant of this invention which describes a technology for determining the curve's radius of curvature from nodes on the road map data of the navigation device.

Figures 10A, 10B:
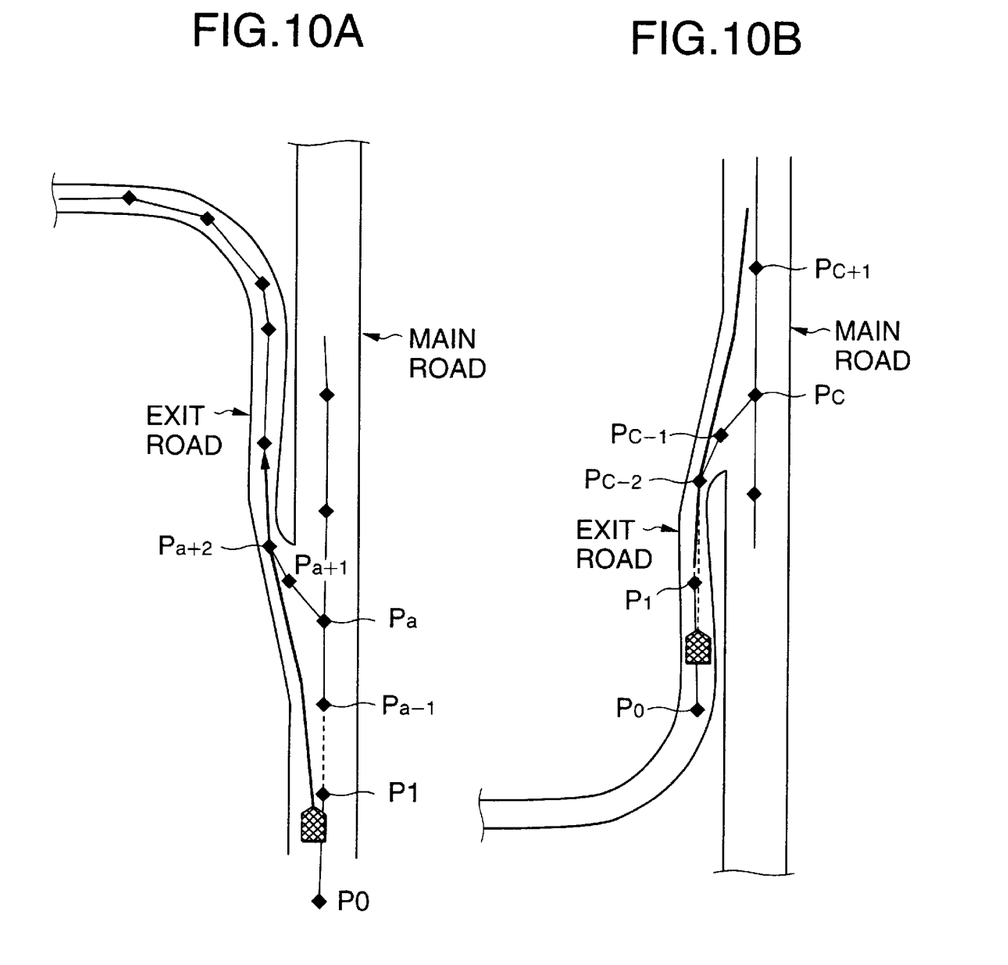
FIGS. 10A and 10B are explanatory diagrams showing an exit/entrance road from/to a main road.

As shown in FIGS. 10A and 10B, it is often the case that in expressways or wide highways (hereinafter referred to as "main roads") there is a large space at a branch point or merge point leading to an entrance road or exit road to and from the main road. Hence, when a driver moves into or out of the main road, he or she generally utilizes the wide space near the branch or merge point to perform as small a cornering operation as possible.

Nodes on a road map in a navigation device are simply plotted near the center of the road, so that a locus of the nodes plotted on the entrance/exit road to/from the main road apparently represents a significantly tighter curve than the actual locus of the vehicle moving into or out of the main road.

Hence, when the vehicle(car) moves into or out of the main road, if a radius of curvature of the curve is determined based on the node data supplied from the navigation device and, based on the curve's radius of curvature, the alarm control and the deceleration control are performed, these controls may become excessive because they are intended for an apparently sharp curve.

SUMMARY OF THE INVENTION

The present invention has been accomplished under these circumstances and provides a curve approach control apparatus which can reduce unwanted alarms and decelerations that will make the driver feel incongruous when the driver moves into or out of expressways and wide highways.

To solve the problem described above, a curve approach control apparatus according to a first aspect of the present invention comprises: a front road attribute calculation/storage means to set a variety of road attribute information for each node on the basis of at least node information representing a road of vehicle travel path and supplied from a navigation device; an allowable approach speed setting means to determine a curve of the travel path based on at least the road attribute information and set an allowable approach speed for the curve that a vehicle can tolerate; and a decision output means to compare the allowable approach speed with a vehicle speed in a predetermined manner and permit an alarm control or a deceleration control for the curve to be executed; wherein a control execution decision means is provided which inhibits the alarm control and the deceleration control when the curve is on an exit/entrance road connecting to a main road.

A curve approach control apparatus according to a second aspect of the present invention comprises: a front road attribute calculation/storage means to set a variety of road attribute information for each node on the basis of at least node information representing a road of vehicle travel path and supplied from a navigation device; an allowable approach speed setting means to determine a curve of the travel path based on at least the road attribute information and set an allowable approach speed for the curve that a vehicle can tolerate; and a decision output means to compare the allowable approach speed with a vehicle speed in a predetermined manner and permit an alarm control or a deceleration control for the curve to be executed; wherein when the node represents an exit/entrance road connecting to a main road, the allowable approach speed for the node is set higher than allowable approach speeds for other nodes.

In a curve approach control apparatus of a third aspect of the present invention according to the first or second aspect, the n ode information supplied from the navigation device has at least road kind information and road width information on the road made up of nodes and intersection information indicating whether an intersection exists at each node position, and the front road attribute calculation/storage means judges whether the road represented by the node is the main road based on the road kind information and the road width information and, if so, judges whether an intersection exists on the main road based on the intersection information, and, when an intersection exists on the main road and node intervals for the nodes following the intersection are and continue to be less than a predetermined multiple of the road width of the main road, the front road attribute calculation/storage means sets a road segment following the intersection as an exit road from the main road.

In a curve approach control apparatus of a fourth aspect of the present invention according to the first or second aspect, the node information supplied from the navigation device has at least road kind information and road width information on the road made up of nodes and intersection information indicating whether an intersection exists at each node position; and the front road attribute calculation/ storage means judges whether the road represented by the node is the main road based on the road kind information and the road width information and, if so, judges whether an intersection exists on the main road based on the intersection information, and, when an intersection exists on the main road and road widths at the nodes following the intersection are and continue to be less than a road width of a node immediately preceding the intersection, the front road attribute calculation/storage means sets a road segment following the intersection as an exit road from the main road.

In a curve approach control apparatus of a fifth aspect of the present invention according to the first or second aspect, the node information supplied from the navigation device has at least road kind information and road width information on the road made up of nodes and intersection information indicating whether an intersection exists at each node position; and the front road attribute calculation/storage means judges whether an intersection exists at the node position based on the intersection information and judges whether a road following the node where it is decided that an intersection exists is a main road based on the road kind information and the road width information, and, when the judge finds that the main road exists following the intersection and that node intervals preceding the intersection are and continue to be less than a predetermined multiple of the road widths at nodes following the intersection, the front road attribute calculation/storage means sets the road segment preceding the intersection as an entrance road to the main road.

In a curve approach control apparatus of a sixth aspect of the present invention according to the first or second aspect, the node information supplied from the navigation device has at least road kind information and road width information on the road made up of nodes and intersection information indicating whether an intersection exists at each node position; and the front road attribute calculation/storage means judges whether an intersection exists at the node position based on the intersection information and judges whether a road following the node where it is decided that an intersection exists is a main road based on the road kind information and the road width information, and, when the judge finds that the main road exists following the intersection and that road widths at nodes preceding the intersection are and continue to be less than road widths at nodes following the intersection, the front road attribute calculation/storage means sets the road segment preceding the intersection as an entrance road to the main road.

DETAILED DESCRIPTION OF THE PREFERRED EMBODIMENT

Figure 2:
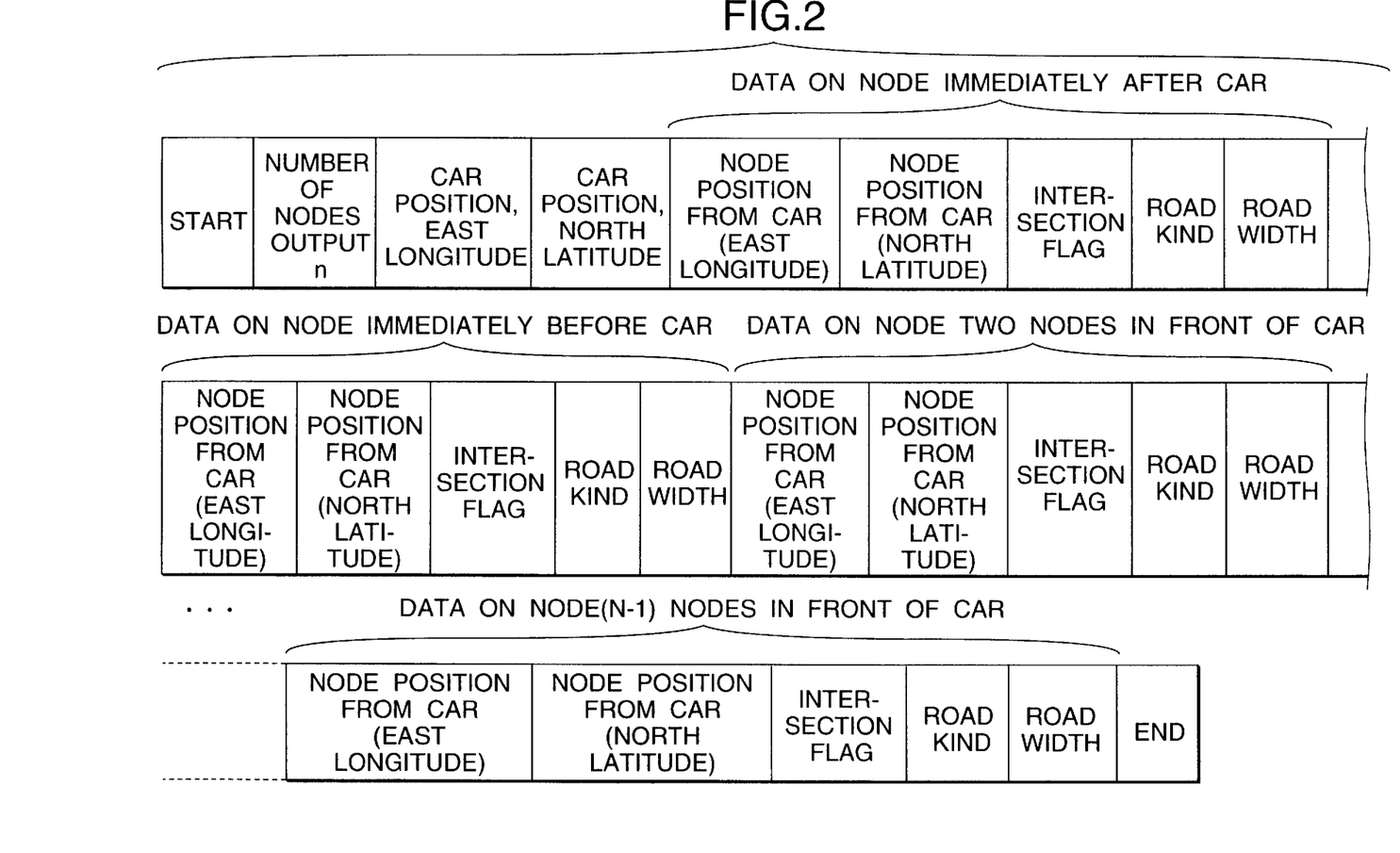
FIG. 2 is an explanatory diagram showing a format of data output from the navigation device to the control unit.
Figure 3:
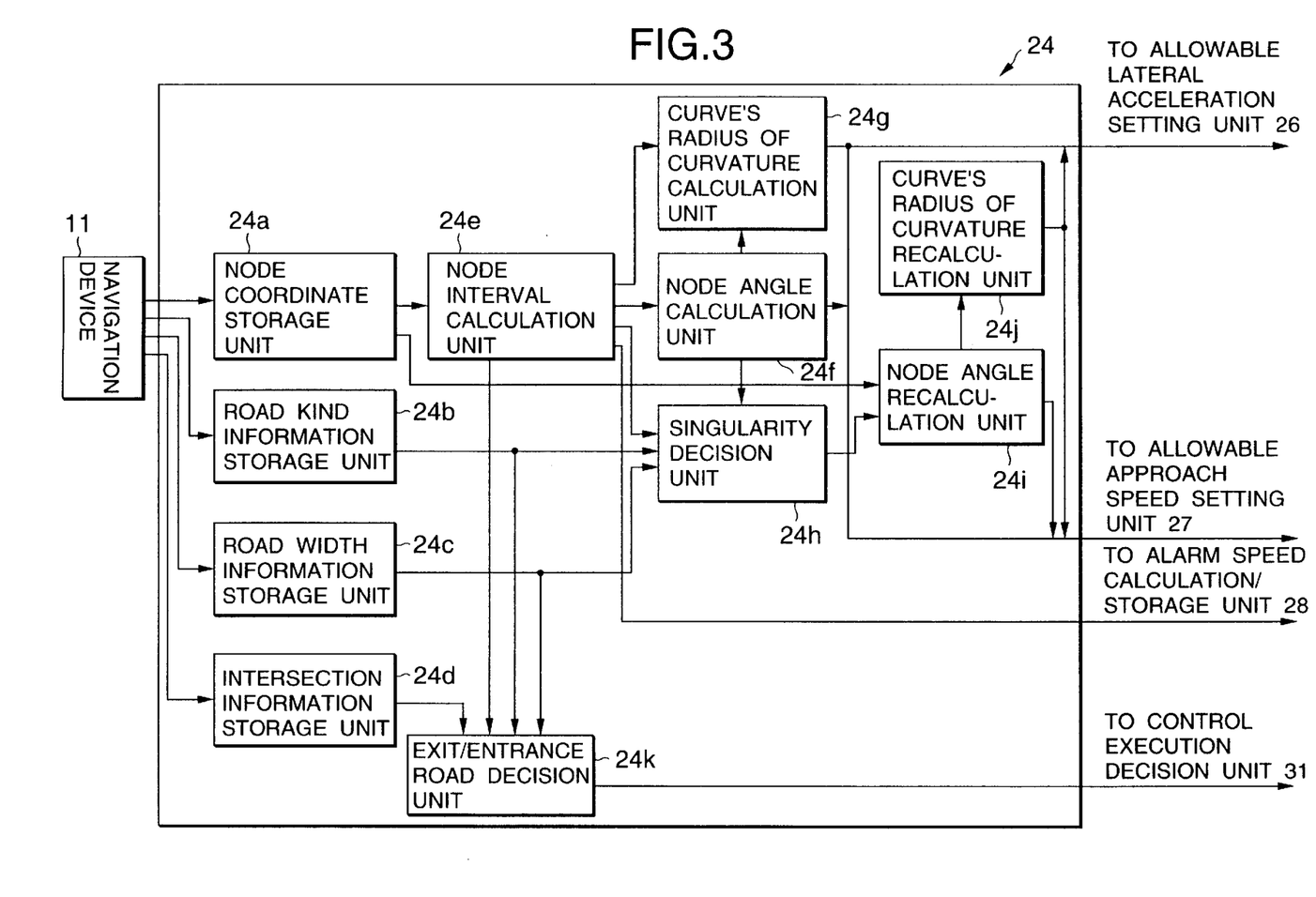
FIG. 3 is a functional block diagram of a front road attribute calculation/storage unit.
Figure 4:
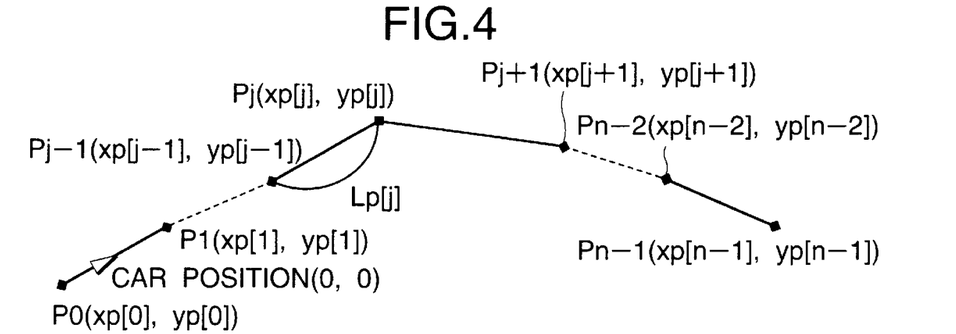
FIG. 4 is an explanatory diagram showing a vehicle position and nodes.
Figure 5:
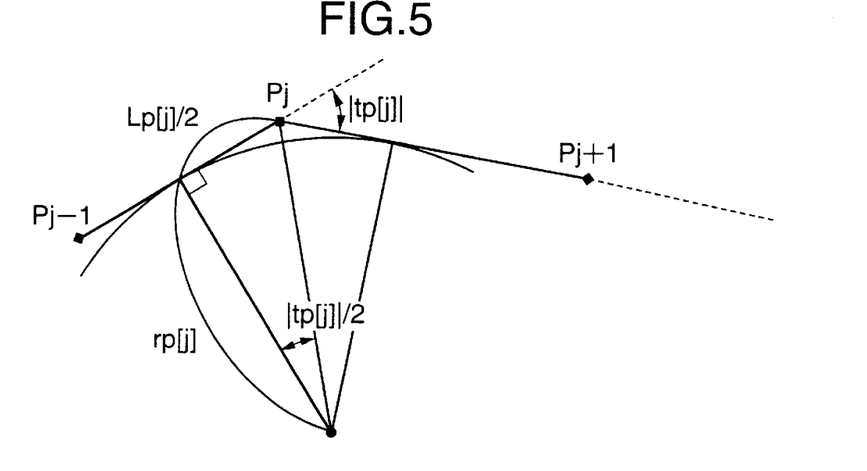
FIG. 5 is an explanatory diagram showing how a node angle and a curve's radius of curvature are calculated.
Figure 6:
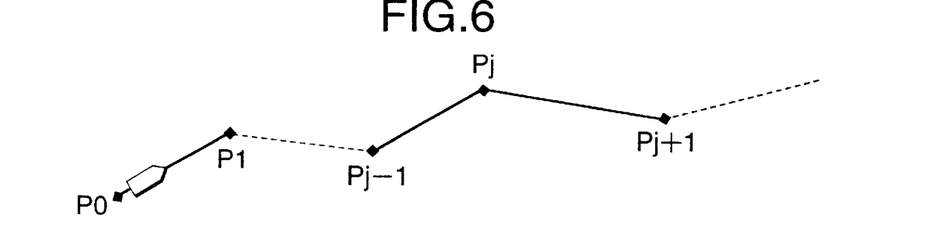
FIG. 6 is an explanatory diagram showing an example of a curve made up of a single node.
Figure 7:
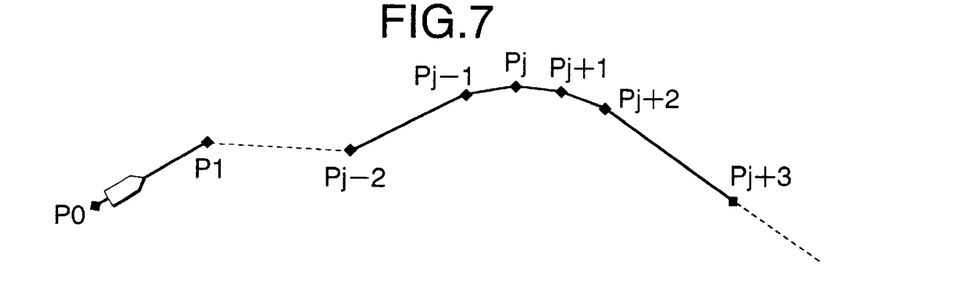
FIG. 7 is an explanatory diagram showing an example of a curve made up of a plurality of nodes.
Figure 8:
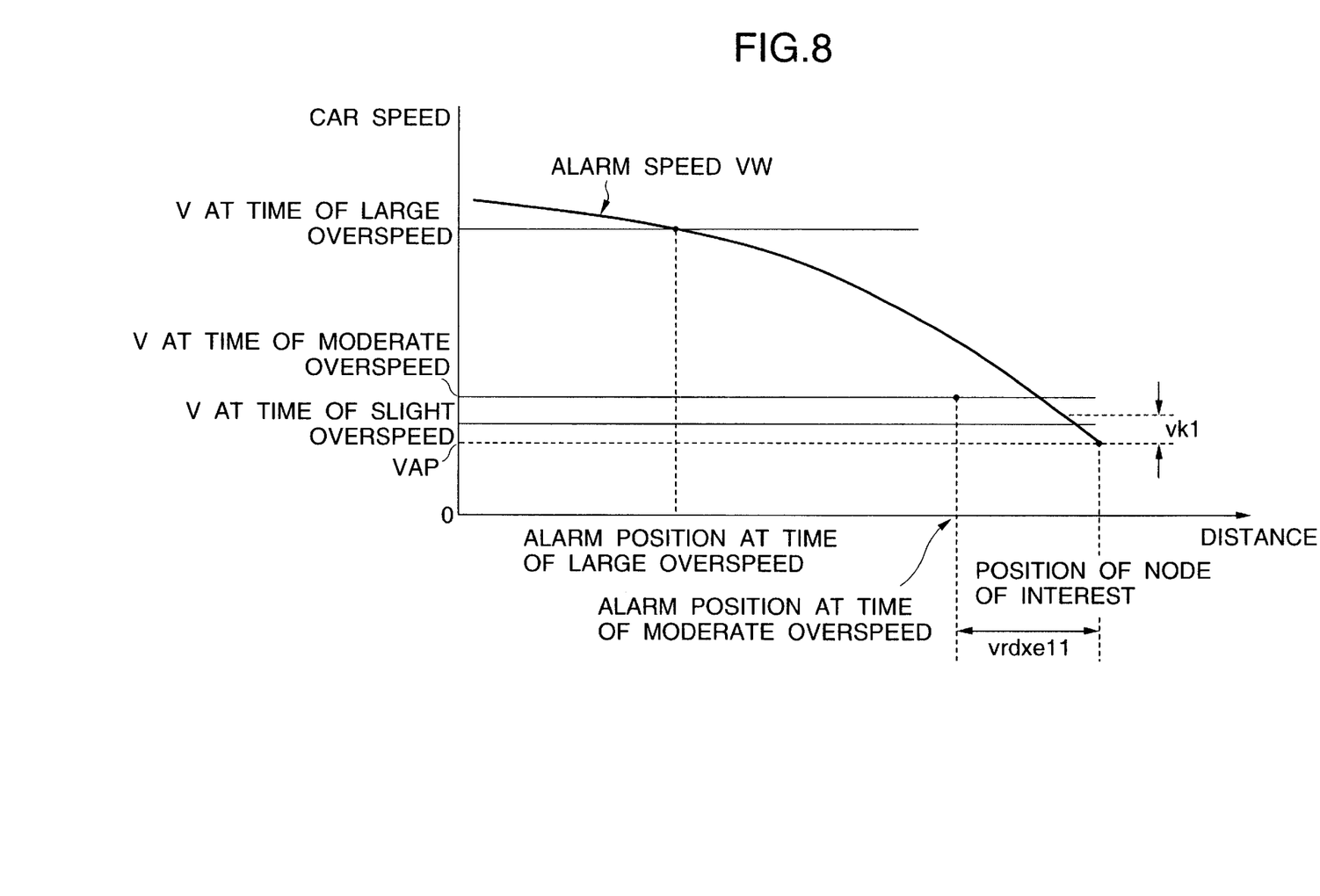
FIG. 8 is a diagram showing a relation between a distance to a node of interest and an alarm speed.
Figure 9:
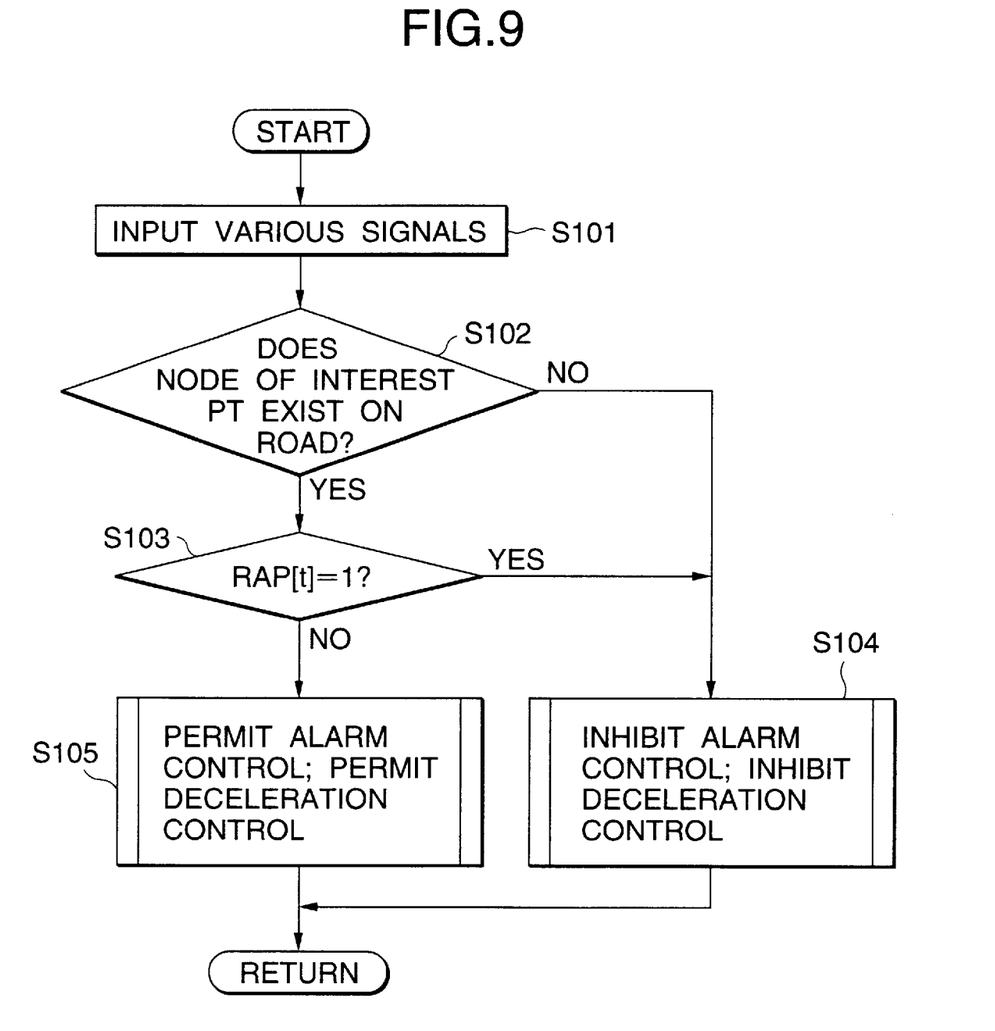
FIG. 9 is a flow chart showing a control execution decision routine.

Now, an embodiment of the present invention will be described by referring to the accompanying drawings. The drawings concern one embodiment of the invention, of which FIG. 1 is a functional block diagram of a curve approach control apparatus, FIG. 2 is an explanatory diagram showing a format of data output from a navigation device to a control unit, FIG. 3 is a functional block diagram of a front road attribute calculation/storage unit, FIG. 4 is an explanatory diagram showing a vehicle(car) position and nodes, FIG. 5 is an explanatory diagram showing how a node angle and a curve's radius of curvature are calculated, FIG. 6 is an explanatory diagram showing a curve made up of a single node, FIG. 7 is an explanatory diagram showing a curve made up of a plurality of nodes, FIG. 8 is a diagram showing the relation between a distance to a node of interest and an alarm speed, FIG. 9 is a flow chart showing a control execution decision routine, and FIGS. 10A and 10B are explanatory diagrams showing exit/entrance roads to/from a main road.

Figure 1:
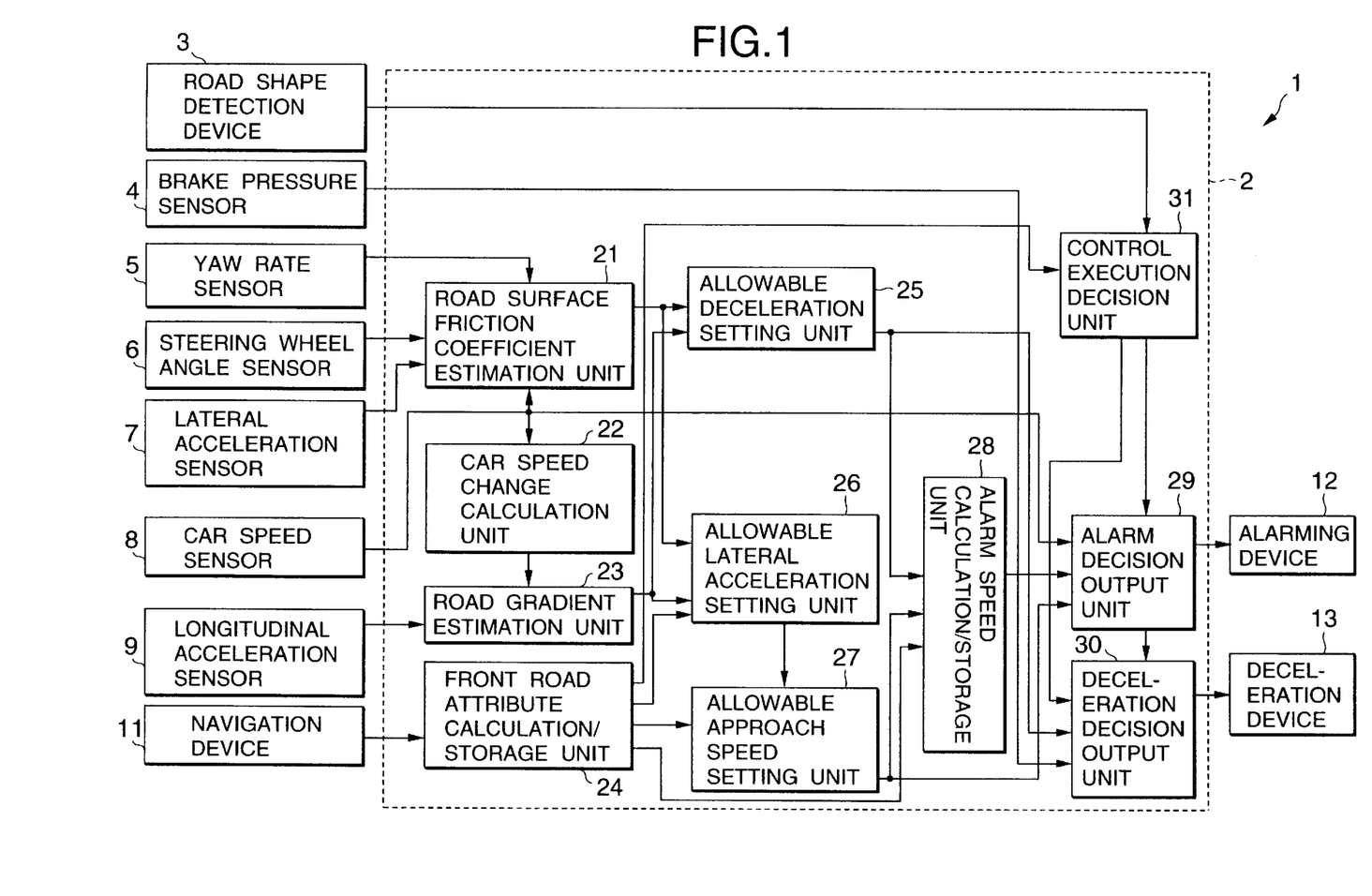
FIG. 1 is a functional block diagram of a curve approach control apparatus.

In FIG. 1, reference numeral 1 represents a curve approach control apparatus. A control unit 2 of the curve approach control apparatus 1 is connected with sensors, such as brake pressure sensor 4, yaw rate sensor 5, steering wheel angle sensor 6, lateral acceleration sensor 7, vehicle(car) speed sensor 8 and longitudinal acceleration sensor 9, and receives signals detected by these sensors, such as driver's brake application force, yaw rate, steering wheel angle, lateral acceleration, vehicle(car) speed and longitudinal acceleration.

The control unit 2 is also connected with a road shape detection device 3 and receives information on the curve geometry of a road in front.

The road shape detection device 3 has, for example, a pair of CCD cameras that photograph an image of the front road in stereo. The road shape detection device 3 processes the road image to recognize a white line, a guardrail, a road side boundary and others and detect a distance to a point where the road in front begins to curve and a degree of the curve (large right curve, moderate right curve, almost straight curve, moderate left curve, and large left curve).

The control unit 2 is also connected with a navigation device 11, which issues, every 500 ms for example, information including a node number n along a vehicle travel route, an east longitude and a north latitude of vehicle position, data on a node directly after the vehicle, and data on nodes within a set range of the vehicle travel route in front of the vehicle (data on a node directly before the vehicle, data on a second node in front of the vehicle, ..., data on an (n−1)th node in front of the vehicle). In this case, data on each node includes, as shown, information such as an eastward distance from the vehicle position to the node, an northward distance from the vehicle position to the node, an intersection flag indicating whether there is an intersection at the node position, a road kind or category, and a road width, or the like.

When the driver inputs a destination, the navigation device 11 sets an optimum guided path the vehicle should travel to reach the input destination. Then, the navigation device 11 outputs to the control unit 2 data on nodes on the set guided path up to 300 m ahead of the vehicle and data on a node immediately after the vehicle as node data of the vehicle travel route.

When on the other hand a destination is not entered by the driver, the navigation device 11 estimates the order of priority of paths that the vehicle will travel, based on information such as road kind and road width and sets a path having the highest priority as an estimated path. Then, the navigation device 11 outputs to the control unit 2 the data on the nodes on the set estimated path up to, for example, 300 m ahead of the vehicle and the data on the node immediately after the vehicle as the node data of the vehicle travel route.

Based on inputs from the sensors 4, 5, 6, 7, 8, 9, 10, the road shape detection device 3 and the navigation device 11, the control unit 2 determines whether the vehicle can safely negotiate a curve of the road in front and, if necessary, issues an alarm to the driver through an alarming device 12 such as a buzzer/voice alarm generating device and alarm lamp. At the same time when a forced deceleration is required, the control unit 2 executes operations such as downshifting of a transmission, activating a brake and/or increasing a braking force through a deceleration device 13 such as transmission control device and brake control device. For that purpose, the control unit 2 comprises a road surface friction coefficient estimation unit 21, a vehicle speed change calculation unit 22, a road gradient estimation unit 23, a front road attribute calculation/storage unit 24, an allowable deceleration setting unit 25, an allowable lateral acceleration setting unit 26, an allowable approach speed setting unit 27, an alarm speed calculation/storage unit 28, an alarm decision output unit 29, a deceleration decision output unit 30, and a control execution decision unit 31.

Based on the yaw rate from the yaw rate sensor 5, the steering wheel angle from the steering wheel angle sensor 6, the lateral acceleration from the lateral acceleration sensor 7 and the vehicle (car) speed from the vehicle (car) speed sensor 8, the road surface friction coefficient estimation unit 21 estimates the road surface friction coefficient $\mu 0$ while the vehicle is traveling. The result of calculation is output to the allowable deceleration setting unit 25. The method of estimating the road surface friction coefficient $\mu$ is detailed in Japanese Patent Unexamined Publication No. Hei. 8-2274 (JP-A-8-2274) filed by the applicant of this invention.

Based on the vehicle speed from the vehicle speed sensor 8, the vehicle (car) speed change calculation unit 22 calculates a rate of change of the vehicle speed every set duration of time and outputs the calculated result to the road gradient estimation unit 23.

The road gradient estimation unit 23, based on the longitudinal acceleration from the longitudinal acceleration sensor 9 and the rate of change of the vehicle speed from the vehicle(car) speed change calculation unit 22, estimates the road gradient SL and outputs the calculated result to the allowable deceleration setting unit 25 and the allowable lateral acceleration setting unit 26. The method of estimating the road gradient SL is detailed in Japanese Patent Unexamined Publication No. Hei. 11-83501(JP-A-11-83501) filed by the applicant of this invention.

The front road attribute calculation/storage unit 24, based on the position information for each node sent from the navigation device 11, calculates an interval to an immediately preceding node, a curve's radius of curvature and a node angle, stores these data as node attribute information, and also stores information on intersection identification, road kind, road width, singular point identification described later and an exit/entrance road identification as attribute information for each node. Hence, as shown in FIG. 3, the front road attribute calculation/storage unit 24 comprises a node coordinate storage unit 24a, a road kind information storage unit 24b, a road width information storage unit 24c, an intersection information storage unit 24d, a node interval calculation unit 24e, a node angle calculation unit 24f, a curve's radius of curvature calculation unit 24g, a singularity decision unit 24h, a node angle recalculation unit 24i, a curve's radius of curvature recalculation unit 24j, and an exit/entrance road decision unit 24k.

The node coordinate storage unit 24a stores node coordinates (see FIG. 4) with the vehicle position sent from the navigation device 11 taken as a reference: P0 (xp[0], yp[0]), P1 (xp[1], yp[1]), . . . , Pj−1 (xp[j−1], yp[j−1]), Pj (xp[j], yp[j]), . . . , Pn−1 (xp[n−1], yp[n−1]).

The road kind information storage unit 24b uses the road kind data supplied from the navigation device 11 as is and sets the road kind attributes cp[j] as follows and stores them.

For national expressways, cp[j]=5

For city expressways, cp[j]=4

For general national roads, cp[j]=3

For main local roads, cp[j]=2

For other roads, cp[j]=1

The road width information storage unit 24c sets a road width attribute wp[j] based on a flag concerning the road width sent from the navigation device 11, as follows:

when a flag "4" indicating that the road width is 13 m or more is entered, wp[j]=15 m;

when a flag "3" indicating that the road width is 5.5 to 13 m is entered, wp[j]=10 m;

when a flag "2" indicating that the road width is 3 to 5.5 m is entered, wp[j]=5 m;

when a flag "1" indicating that the road width is 3 m or less is entered, wp[j]=3 m; and when a flag "0" indicating that the road width is not yet surveyed, wp[j]=5 m.

The intersection information storage unit 24d uses the intersection flag supplied from the navigation device 11 as is to set and store the intersection identification ip[j].

The intersection information storage unit 24d sets the intersection identification ip[j] as follows:

when an intersection exists at the node position, ip[j]=1; and when an intersection does not exist at the node position, ip[j]=0.

Particularly when an intersection exists at a node position on a guided path leading to a destination that was input by the driver, ip[j]=2 is set.

The node interval calculation unit 24e uses the node coordinates stored in the node coordinate storage unit 24a to calculate the interval Lp[j] between a node Pj and an immediately preceding node Pj−1 from the following equation.

$$Lp[j]=\{(xp[j]-xp[j-1])^2+(yp[j]-yp[j-1])^2\}^{1/2}$$

(where $1 \leq j \leq n-1$)

The node angle calculation unit 24f calculates the node angle tp[j] at each node Pj based on the node coordinates as shown in FIG. 5.

$$tp[j]=\sin^{-1}[\{(xp[j-1]-xp[j])(yp[j]-yp[j+1])-(xp[j]-xp[j+1]-yp[j])\}/(Lp[j]Lp[j+1])]$$

Based on the node interval Lp[j] and the node angle tp[j], the curve's radius of curvature calculation unit 24g calculates the curve's radius of curvature rp[j] at the node Pj from the following equation:

$$rp[j]=\min(Lp[j], Lp[j+1])/2/\tan(|tp[j]|/2)$$

The singularity decision unit 24h judges each node Pj for singularity based on the node interval Lp[j] and node angle tp[j] by considering the road kind attribute cp[j] and road width attribute wp[j]. That is, there is a general tendency that as the road width widens as in expressways, the number of sharp curves decreases and that as the road width narrows as in local roads, the number of sharp curves increases. When the adjacent nodes on a wide road are too close to each other, the calculated curve's radius of curvature may become excessively smaller than the actual road's radius of curvature. Hence, to exclude such an unrealistic curve's radius of curvature, the singularity decision unit 24h judges for singularity. An appropriate singularity judgment is realized by rendering it more likely or easier to determine a node as a singular point as the values of the road kind attribute cp[j] and the road width attribute wp[j] increase.

When the singularity decision unit 24h decides that the node Pj is a singular point, the node angle recalculation unit 24i calculates the node angle tp[j+1] between nodes (Pj−1, Pj+1) immediately before and after the singular point node Pj by excluding the singular point node Pj.

The curve's radius of curvature recalculation unit 24j recalculates the curve's radius of curvature rp[j+1] by using the node angle recalculated by the node angle recalculation unit 24i.

For each node supplied from the navigation device 11, the exit/entrance road decision unit 24k judges whether the node represents an entrance road or exit road to or from an expressway or wide highway (hereinafter referred to as a "main road") and sets an exit/entrance road identification rap[j] accordingly.

The exit/entrance road identification rap[j] is set as follows:
when the node Pj is an exit/entrance road, rap[j]=1; and
when the node Pj is not an exit/entrance road, rap[j]=0.

(1) Decision on Exit Road

The exit road decision unit 24k first judges whether the intersection identification is ip[j]≠0 for each node Pj.

Then, as shown in FIG. 10A, when the intersection identification for a node Pa is ip[a]≠0, the exit road decision unit 24k judges whether a node Pa−1 immediately preceding the node Pa represents the main road, on the basis of the road kind attribute cp[a−1] and the road width attribute wp[a−1] of the node Pa−1.

Next, when the node Pa−1 represents the main road, the exit road decision unit 24k compares a predetermined multiple wk of the road width attribute wp[a−1] with each of the node intervals Lp[a], Lp[a+1], Lp[a+2], . . . for the node Pa and subsequent nodes and decides that a road represented by a series of nodes following the node Pa with their node intervals equal to or less than wk is an exit road from the main road.

It is also possible to use as the exit road decision condition whether the road width attribute wp[a−1] of the node Pa−1, which immediately precedes the node Pa, is larger than the road width attributes wp[a+1], wp[a+2], . . . for a node Pa+1 and subsequent nodes.

(2) Decision on Entrance Road

The exit road decision unit 24k first judges whether the intersection identification is ip[j]≠0 for each node Pj.

Then, as shown in FIG. 10B, when the intersection identification for a node Pc is ip[c]≠0, the exit road decision unit 24k judges whether a node Pc+1 immediately following the node Pc represents the main road, on the basis of the road kind attribute cp[c+1] and the road width attribute wp[c+1] of the node Pc+1.

Next, when the node Pc+1 represents the main road, the exit road decision unit 24k compares a predetermined multiple wk of the road width attribute wp[c+1] with each of the node intervals Lp[c], Lp[c−1], Lp[c−2], . . . for the node Pc and preceding nodes and decides that a road represented by a series of nodes preceding the node Pc with their node intervals equal to or less than wk is an entrance road to the main road.

It is also possible to use as the entrance road decision condition whether the road width attributes wp[c−1], wp[c−2], . . . of the node Pc−1 and preceding nodes are narrower than the road width attribute wp[c+1] for a node Pc+1 immediately following the node Pc.

The allowable deceleration setting unit 25 sets an allowable deceleration XgLim that the vehicle can tolerate, based on the road surface friction coefficient $\mu$ and the road gradient SL.

That is, the allowable deceleration setting unit 25 determines a reference value XgLim0 based on the present road surface friction coefficient $\mu$ and then corrects the reference value XgLim0 with the road gradient SL to determine the allowable deceleration XgLim. An example method of calculating the allowable deceleration XgLim is detailed in JP-A-11-83501 filed by the applicant of the present invention.

The allowable lateral acceleration setting unit 26 sets an allowable lateral acceleration ayl that the vehicle can tolerate, based on the road surface friction coefficient $\mu$, the road gradient SL and the curve's radius of curvature rp [j].

That is, the allowable lateral acceleration setting unit 26 first calculates a reference value ayl1 of the allowable lateral acceleration ayl based on the road surface friction coefficient $\mu$. An example method of calculating the reference value ayl1 is detailed in JP-A-11-83501 filed by the applicant of this invention.

Next, the allowable lateral acceleration setting unit 26 calculates an allowable lateral acceleration ayl2 from the following equation by correcting the reference value ayl1 with the road gradient SL.

$$ayl2 = (ayl1^2 - (g \cdot SL/100)^2)^{1/2}$$

Next, the allowable lateral acceleration setting unit 26 calculates an allowable lateral acceleration ayl from $$ayl = ayl2 \cdot Kv$$

where Kv is a vehicle(car) speed correction coefficient corresponding to the curve approach limit speed $(ayl1/rp[j])^{1/2}$. The vehicle speed correction coefficient takes a smaller value as the curve approach limit speed increases. That is, by performing the correction that reduces the allowable lateral acceleration as the curve approach limit speed increases, the safety with which the vehicle corners at high speed is enhanced.

The allowable approach speed setting unit 27 calculates an allowable approach speed vap of the vehicle for each node based on the node attribute information stored in the front road attribute calculation/storage unit 24 and the allowable lateral acceleration ayl set by the allowable lateral acceleration setting unit 26.

That is, the allowable approach speed setting unit 27 uses the allowable lateral acceleration ayl and the curve's radius of curvature rp[j] to determine the allowable approach speed reference value vap0[j] for each node Pj from the following equation.

$$vap0[j] = (ayl \cdot rp[j])^{1/2}$$

Next, the allowable approach speed setting unit 27 judges whether adjacent nodes make up the same curve.

In more concrete terms, there are two patterns in which a curve is formed: one in which a curve is made up of a single node Pj as shown in FIG. 6; and one in which a curve is made up of a plurality of nodes (in the example shown, Pj−1 to Pj+2) as shown in FIG. 7. To determine whether or not the adjacent nodes Pj−1 and Pj belong to the same curve, the allowable approach speed setting unit 27 judges whether the node interval Lp[j] is smaller than a predetermined value (LK·wp[j]) and whether the node angles tp[j−1], tp[j] have equal signs.

Next, the allowable approach speed setting unit 27 determines the depth of curve tpa for each node. The curve depth tpa is obtained by summing up the node angles of those nodes belonging to the same curve which precede and include the node of interest. For example, the curve depth of each node shown in FIG. 7 is as follows: tpa[j−1]=tp[j−1], tpa[j]=tp[j−1]+tp[j], tpa[j+1]=tp[j−1]+tp[j]+tpa[j+1], tpa[j+2]=tp[j−1]tpa[j]+tpa[j+1]+tp[j+2]. In the example shown in FIG. 6, the curve depth of the node Pj is tpa[j]=tp[j].

Next, the allowable approach speed setting unit 27 uses the curve depth tpa to correct the allowable approach speed reference value vap0 for each node to determine the allowable approach speed vap1. The allowable approach speed vap1 can be determined, for example, from:

$$vap1 = (\text{reference value } vap0) \cdot (\text{curve depth correction coefficient } Kt)$$

The curve depth correction coefficient Kt is set to decrease as the curve depth tpa increases.

Then, when the curve is tight, with the curve's radius of curvature rp[j] for each node less than a predetermined percentage rwk of the road width wp [j], the allowable approach speed setting unit 27 further corrects the allowable approach speed vap1 to determine an allowable approach speed vap2 in order to prevent the allowable approach speed from becoming extremely small. The allowable approach speed vap2 is set by comparing a predetermined value $(ayl \cdot wk \cdot rwk)^{1/2}$ corresponding to the road width with the allowable approach speed vap1 and selecting whichever is larger. That is, the allowable approach speed vap2 is determined from $$vap2 = \max\{(vap1, (ayl \cdot wk \cdot rwk)^{1/2}\}$$

Next, the allowable approach speed setting unit 27 smoothes out the allowable approach speeds vap2 of the nodes making up the same curve to determine a final allowable approach speed vap for each node.

In more concrete terms, the smoothing of the allowable approach speeds by the allowable approach speed setting unit 27 consists in: comparing three values, which are an allowable approach speed vap2[j] for the node Pj of interest among the nodes making up the same curve, an average of the allowable approach speed vap2[j] and an allowable approach speed vap2[j+1] for the next node Pj+1, and an average of the allowable approach speed vap2[j] and an allowable approach speed vap2[j−1] for the preceding node Pj−1; and setting a median value of the three values as a final allowable approach speed vap for the node Pj.

For all of the n nodes sent from the navigation device 11, excluding the node P0 immediately after the vehicle, the farthest node Pn−1 and the singular node, the alarm speed calculation/storage unit 28 uses the node interval Lp[j], allowable deceleration XgLim and allowable approach speed vap[j] to calculate an alarm speed vw[j] that constitutes a reference for the alarm control.

The alarm speed vw[j] is set such that when the vehicle is decelerated by 50% of the allowable deceleration XgLim when the vehicle travels from the present vehicle position to the node Pj of interest, the vehicle speed will become the allowable approach speed vap [j]. The alarm speed vw [j] can be determined from $$vw[j] = (vap[j] + 2 \cdot (0.5 \cdot XgLim)LL[j])^{1/2}$$

where LL[j] is a distance from the vehicle position to the node Pj and can be determined as follows:

When j=1, $LL[1] = (xp[1]^2 + yp[11]^2)^{1/2}$
When $2 \leq j \leq n-1$, $LL[j] = LL[1] + Lp[2] + Lp[3] + \ldots + Lp[j]$ The alarm decision output unit 29 decides whether it is necessary to output an alarm, based on the vehicle speed v detected by the vehicle speed sensor 8, the allowable approach speed vap[j] set for each node by the allowable approach speed setting unit 27 and the alarm speed vw[j] calculated for each node by the alarm speed calculation/storage unit 28. Then, when the alarm decision output unit 29 decides that it is necessary to output an alarm and receives an enable signal for executing the alarm control from the control execution decision unit 31, the alarm decision output unit 29 outputs a control signal to the alarming device 12 to execute the alarm control.

In more concrete terms, the alarm decision output unit 29 sets as a node of interest Pt for executing the alarm control the node which has a minimum alarm speed vw[j] calculated by the alarm speed calculation/storage unit 28 and, as shown in FIG. 8, compares the alarm speed vw[t] at the node Pt with the vehicle speed v entered from the vehicle speed sensor 8. When the vehicle speed v is larger than the alarm speed vw[t] and a difference between the allowable approach speed vap[t] at the node [Pt] of interest and the vehicle speed v is equal to or more than a predetermined value vk1 (for example, 5 km/h), the alarm decision output unit 29 decides that the vehicle is running in an overspeed state and that it is necessary to issue an alarm.

When the difference between the vehicle speed v and the allowable approach speed vap[t] at the node Pt of interest is equal to or more than the predetermined value vk1 but when the vehicle speed v is still not in excess of the alarm speed vw[t] and the distance LL[t] to the node Pt of interest is equal to or less than a predetermined value vrdxell, the alarm decision output unit 29 decides that the vehicle is running in an overspeed state and that it is necessary to output an alarm. Here, the predetermined value vrdxell is a function of vehicle speed and takes a greater value as the vehicle speed increases. For example, it is set to vrdxell=2·v (=distance traveled for two seconds).

The deceleration decision output unit 30 judges whether a forced deceleration is required for the node Pt of interest for which the alarm decision output unit 29 has decided that an alarm output is necessary. When the driver has not performed an appropriate deceleration operation for a predetermined period (for example, two seconds) after the alarm decision output unit 29 has decided that it is necessary to output an alarm to the node Pt of interest, the deceleration decision output unit 30 decides that it is necessary to perform the deceleration operation on this node Pt. When the deceleration decision output unit 30 decides that the deceleration is required and receives a deceleration control execution enable signal from the control execution decision unit 31, the deceleration decision output unit 30 outputs a control signal to the deceleration device 13 to execute the deceleration control.

The control execution decision unit 31 is formed as a control execution decision means and makes a decision on whether an alarm control on the node Pt of interest should be permitted to be executed and also on whether a deceleration control on the node Pt of interest should be permitted.

The decision made by the control execution decision unit 31 follows the flow chart of FIG. 9. First, at step 101 (or S101) the control execution decision unit 31 reads signals from various sensors and from the road shape detection device 3, the front road attribute calculation/storage unit 24 and others.

Next, the program proceeds to S102 where it judges whether the node Pt of interest set by the alarm decision output unit 29 actually exists on the road, i.e., whether a road made up of nodes including the node of interest actually exists. This decision is made by comparing the information on the node Pt of interest (a curve's radius of curvature rp[t] and a distance LL[t]) with the information on the road in front detected by the road shape detection device 3 (a curve's radius of curvature and a distance).

Then when at step S102 the information on the node Pt of interest based on the node data sent from the navigation device 11 and the information on the road in front detected by the road shape detection device 3 do not agree, it is highly likely that the road under consideration differs from the road information stored in the CD-ROM in the navigation device 11 due to extension or modification constructions of the road. In this case, it is decided that the node Pt of interest does not exist on the road and the program moves to S104 where it inhibits the alarm decision output unit 29 from executing the deceleration decision output unit 30 from executing the deceleration control, before exiting the routine.

On the other hand, when at the step S102 the information on the node Pt of interest based on the node data and the information on the road in front detected by the road shape detection device 3 agree and it is decided that the node Pt of interest actually exists on the road, the program moves to step S103 where it judges whether the exit/entrance road identification rap[t] for the node of interest Pt is "1".

When at S103 the exit/entrance road identification is found to be rap[t]=1, it is decided that the node of interest Pt represents an exit/entrance road connecting to the main road. The program then moves to step S104 where it inhibits the alarm control and the deceleration control.

When at S103 the exit/entrance road identification is found to be rap[t]=0, it is decided that the node of interest Pt does not represent an exit/entrance road connecting to the main road. The program then moves to step S105 where it permits the alarm control and the deceleration control, before exiting the routine.

As described above, with the embodiment of this invention, when the node of interest Pt, which is covered by the alarm and deceleration controls, represents an exit/entrance road connecting to the main road, the alarm control and the deceleration control are not performed considering that it is highly likely that the actual curve is less tight than the apparent curve represented by the nodes. This can reduce the confusion that the alarm and deceleration may cause to the driver when the vehicle is moving into or out of the main road.

Particularly when the alarm is issued in the form of a continuous sound of buzzer or chime or a continuous blinking of an alarm lamp, this form of control can reduce the sense of incongruity the driver may feel due to unnecessary alarms.

In the above embodiment, the control execution decision unit 31 inhibits the alarm control and the deceleration control when the node of interest Pt represents an exit/entrance road connecting to the main road. Instead of this processing, the allowable approach speed setting unit 27 may set to a high value the allowable approach speed vap for the node representing the exit/entrance road to make the alarm control and the deceleration control less responsive.

This setting is done as follows. When the allowable approach speed vap is set by the allowable approach speed setting unit 27, it is judged whether the exit/entrance road identification rap[j] for each node is rap [j]=1. For the node with rap[j]=1, the allowable approach speed vap2 is smoothed and further corrected to a higher value, which is then set as the allowable approach speed vap for the node.

This processing makes the node representing the exit/entrance road less likely to be set by the alarm decision output unit 29 as the node of interest Pt for the alarm control (and deceleration control). This in turn reduces the likelihood of execution of unwanted alarm and deceleration that will make the driver feel incongruous when he or she moves into or out of the main road.

As described above, this invention can reduce confusion that the alarm and deceleration may cause to the driver when he or she moves into or out of an expressway or wide highway.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A curve approach control apparatus comprising:
   a front road attribute calculation/storage unit for setting a variety of road attribute information for each node on the basis of node information representing a road of vehicle travel, the information being supplied from a navigation device;
   a control unit for performing alarm control or deceleration control for curve calculated on basis of the road attribute information; and
   a decision unit for inhibiting the alarm control and the deceleration control when the curve is on an exit/entrance road connecting to a main road.

2. The curve approach control apparatus according to claim 1, wherein the node information supplied from a navigation device includes at least road kind information and road width information on the road made up of nodes and intersection information indicating whether an intersection exists at each node position; and
   wherein said front road attribute calculation/storage unit judges whether the road represented by the node is the main road based on the road kind information and the road width information, judges whether an intersection exists on the main road based on the intersection information when it is decided that the road represented by the node is the main road, and sets a road segment following the intersection as an exit road from the main road when an intersection exists on the main road and node intervals for the nodes following the intersection are and continue to be less than a predetermined multiple of the road width of the main road.

3. The curve approach control apparatus according to claim 1, wherein the node information supplied from a navigation device includes at least road kind information and road width information on the road made up of nodes and intersection information indicating whether an intersection exists at each node position;
   wherein said front road attribute calculation/storage unit judges whether the road represented by the node is the main road based on the road kind information and the road width information, judges whether an intersection exists on the main road based on the intersection information when the road represented by the node is the main road, and sets a road segment following the intersection as an exit road from the main road when an intersection exists on the main road and road widths at the nodes following the intersection are and continue to be less than a road width of a node immediately preceding the intersection.

4. The curve approach control apparatus according to claim 1, wherein the node information supplied from a navigation device includes at least road kind information and road width information on the road made up of nodes and intersection information indicating whether an intersection exists at each node position;

wherein said front road attribute calculation/storage unit judges whether an intersection exists at the node position based on the intersection information, judges whether a road following the node where it is decided that an intersection exists is a main road based on the road kind information and the road width information, and sets the road segment preceding the intersection as an entrance road to the main road when the judge finds that the main road exists following the intersection and that node intervals preceding the intersection are and continue to be less than a predetermined multiple of the road widths at nodes following the intersection.

5. The curve approach control apparatus according to claim 1, wherein the node information supplied from a navigation device includes at least road kind information and road width information on the road made up of nodes and intersection information indicating whether an intersection exists at each node position;

wherein said front road attribute calculation/storage unit judges whether an intersection exists at the node position based on the intersection information and judges whether a road following the node where it is decided that an intersection exists is a main road based on the road kind information and the road width information, and sets the road segment preceding the intersection as an entrance road to the main road when the judge finds that the main road exists following the intersection and that road widths at nodes preceding the intersection are and continue to be less than road widths at nodes following the intersection.

6. A curve approach control apparatus comprising:

a front road attribute calculation/storage unit for setting a variety of road attribute information for each node on the basis of node information representing a road of vehicle travel, the information being supplied from a navigation device;

a control unit for comparing allowable approach speed with vehicle speed in a predetermined manner and performing alarm control or deceleration control for curve calculated on basis of the road attribute information; and a setting unit for setting the allowable approach speed for the node higher than allowable approach speeds for other nodes when the node represents an exit/entrance road connecting to a main road.

7. The curve approach control apparatus according to claim 6, wherein the node information supplied from a navigation device includes at least road kind information and road width information on the road made up of nodes and intersection information indicating whether an intersection exists at each node position; and wherein said front road attribute calculation/storage unit judges whether the road represented by the node is the main road based on the road kind information and the road width information, judges whether an intersection exists on the main road based on the intersection information when it is decided that the road represented by the node is the main road, and sets a road segment following the intersection as an exit road from the main road when an intersection exists on the main road and node intervals for the nodes following the intersection are and continue to be less than a predetermined multiple of the road width of the main road.

8. The curve approach control apparatus according to claim 6, wherein the node information supplied from a navigation device includes at least road kind information and road width information on the road made up of nodes and intersection information indicating whether an intersection exists at each node position;

wherein said front road attribute calculation/storage unit judges whether the road represented by the node is the main road based on the road kind information and the road width information, judges whether an intersection exists on the main road based on the intersection information when the road represented by the node is the main road, and sets a road segment following the intersection as an exit road from the main road when an intersection exists on the main road and road widths at the nodes following the intersection are and continue to be less than a road width of a node immediately preceding the intersection.

9. The curve approach control apparatus according to claim 6, wherein the node information supplied from a navigation device includes at least road kind information and road width information on the road made up of nodes and intersection information indicating whether an intersection exists at each node position;

wherein said front road attribute calculation/storage unit judges whether an intersection exists at the node position based on the intersection information, judges whether a road following the node where it is decided that an intersection exists is a main road based on the road kind information and the road width information, and sets the road segment preceding the intersection as an entrance road to the main road when the judge finds that the main road exists following the intersection and that node intervals preceding the intersection are and continue to be less than a predetermined multiple of the road widths at nodes following the intersection.

10. The curve approach control apparatus according to claim 6, wherein the node information supplied from a navigation device includes at least road kind information and road width information on the road made up of nodes and intersection information indicating whether an intersection exists at each node position;

wherein said front road attribute calculation/storage unit judges whether an intersection exists at the node position based on the intersection information and judges whether a road following the node where it is decided that an intersection exists is a main road based on the road kind information and the road width information, and sets the road segment preceding the intersection as an entrance road to the main road when the judge finds that the main road exists following the intersection and that road widths at nodes preceding the intersection are and continue to be less than road widths at nodes following the intersection.

11. A method for curve approach control, comprising:

(i) setting a variety of road attribute information for each node on the basis of node information representing a road of vehicle travel, the information being supplied from a navigation device;

performing alarm control or deceleration control for curve calculated on basis of the road attribute information; and inhibiting the alarm control and the deceleration control when the curve is on an exit/entrance road connecting to a main road.

12. The method for curve approach control according to claim 11, wherein the node information supplied from a navigation device includes at least road kind information and road width information on the road made up of nodes and intersection information indicating whether an intersection exists at each node position; and wherein said setting step(i) comprises:

judging whether the road represented by the node is the main road based on the road kind information and the road width information;

judging whether an intersection exists on the main road based on the intersection information when it is decided that the road represented by the node is the main road; and setting a road segment following the intersection as an exit road from the main road when an intersection exists on the main road and node intervals for the nodes following the intersection are and continue to be less than a predetermined multiple of the road width of the main road.

13. The method for curve approach control according to claim 11, wherein the node information supplied from a navigation device includes at least road kind information and road width information on the road made up of nodes and intersection information indicating whether an intersection exists at each node position;

wherein said setting step(i) comprises:

judging whether the road represented by the node is the main road based on the road kind information and the road width information;

judging whether an intersection exists on the main road based on the intersection information when the road represented by the node is the main road; and setting a road segment following the intersection as an exit road from the main road when an intersection exists on the main road and road widths at the nodes following the intersection are and continue to be less than a road width of a node immediately preceding the intersection.

14. The method for curve approach control according to claim 11, wherein the node information supplied from a navigation device includes at least road kind information and road width information on the road made up of nodes and intersection information indicating whether an intersection exists at each node position;

wherein said setting step(i) comprising:

judging whether an intersection exists at the node position based on the intersection information;

judging whether a road following the node where it is decided that an intersection exists is a main road based on the road kind information and the road width information; and setting the road segment preceding the intersection as an entrance road to the main road when the judge finds that the main road exists following the intersection and that node intervals preceding the intersection are and continue to be less than a predetermined multiple of the road widths at nodes following the intersection.

15. The method for curve approach control according to claim 11, wherein the node information supplied from a navigation device includes at least road kind information and road width information on the road made up of nodes and intersection information indicating whether an intersection exists at each node position;

wherein said setting step(i) comprises:

judging whether an intersection exists at the node position based on the intersection information;

judges whether a road following the node where it is decided that an intersection exists is a main road based on the road kind information and the road width information; and setting the road segment preceding the intersection as an entrance road to the main road when the judge finds that the main road exists following the intersection and that road widths at nodes preceding the intersection are and continue to be less than road widths at nodes following the intersection.

16. A method for curve approach control, comprising:

(i) setting a variety of road attribute information for each node on the basis of node information representing a road of vehicle travel, the information being supplied from a navigation device;

comparing allowable approach speed with vehicle speed in a predetermined manner;

performing alarm control or deceleration control for curve calculated on basis of the road attribute information; and setting the allowable approach speed for the node higher than allowable approach speeds for other nodes when the node represents an exit/entrance road connecting to a main road.

17. The method for curve approach control according to claim 16, wherein the node information supplied from a navigation device includes at least road kind information and road width information on the road made up of nodes and intersection information indicating whether an intersection exists at each node position; and wherein said setting step(i) comprises:

judging whether the road represented by the node is the main road based on the road kind information and the road width information;

judging whether an intersection exists on the main road based on the intersection information when it is decided that the road represented by the node is the main road; and setting a road segment following the intersection as an exit road from the main road when an intersection exists on the main road and node intervals for the nodes following the intersection are and continue to be less than a predetermined multiple of the road width of the main road.

18. The method for curve approach control according to claim 16, wherein the node information supplied from a navigation device includes at least road kind information and road width information on the road made up of nodes and intersection information indicating whether an intersection exists at each node position;

wherein said setting step(i) comprises:

judging whether the road represented by the node is the main road based on the road kind information and the road width information;

judging whether an intersection exists on the main road based on the intersection information when the road represented by the node is the main road; and setting a road segment following the intersection as an exit road from the main road when an intersection exists on the main road and road widths at the nodes following the intersection are and continue to be less than a road width of a node immediately preceding the intersection.

19. The method for curve approach control according to claim 16, wherein the node information supplied from a navigation device includes at least road kind information and road width information on the road made up of nodes and intersection information indicating whether an intersection exists at each node position;

wherein said setting step(i) comprising:

judging whether an intersection exists at the node position based on the intersection information;

judging whether a road following the node where it is decided that an intersection exists is a main road based on the road kind information and the road width information; and setting the road segment preceding the intersection as an entrance road to the main road when the judge finds that the main road exists following the intersection and that node intervals preceding the intersection are and continue to be less than a predetermined multiple of the road widths at nodes following the intersection.

20. The method for curve approach control according to claim 16, wherein the node information supplied from a navigation device includes at least road kind information and road width information on the road made up of nodes and intersection information indicating whether an intersection exists at each node position;

wherein said setting step(i) comprises:

judging whether an intersection exists at the node position based on the intersection information;

judges whether a road following the node where it is decided that an intersection exists is a main road based on the road kind information and the road width information; and setting the road segment preceding the intersection as an entrance road to the main road when the judge finds that the main road exists following the intersection and that road widths at nodes preceding the intersection are and continue to be less than road widths at nodes following the intersection.

* * * * *